US011250486B1

(12) United States Patent
Leveau et al.

(10) Patent No.: US 11,250,486 B1
(45) Date of Patent: Feb. 15, 2022

(54) SYSTEMS AND METHODS FOR DISPLAYING FILTERS AND INTERCEPTS LEVERAGING A PREDICTIVE ANALYTICS ARCHITECTURE

(71) Applicant: RentPath, LLC, Atlanta, GA (US)

(72) Inventors: Frederic Leveau, Atlanta, GA (US); Kevin Bruce Olson, Fort Worth, TX (US); Alexandra Elizabeth Barnes, Atlanta, GA (US)

(73) Assignee: RentPath Holdings, Inc., Atlanta, GA (US)

( * ) Notice: Subject to any disclaimer, the term of this patent is extended or adjusted under 35 U.S.C. 154(b) by 94 days.

(21) Appl. No.: 16/531,658

(22) Filed: Aug. 5, 2019

Related U.S. Application Data

(60) Provisional application No. 62/714,288, filed on Aug. 3, 2018.

(51) Int. Cl.
| | |
|---|---|
| *G06Q 30/06* | (2012.01) |
| *G06F 16/9535* | (2019.01) |
| *G06F 16/9538* | (2019.01) |
| *G06N 20/00* | (2019.01) |
| *G06F 3/0482* | (2013.01) |
| *G06F 9/451* | (2018.01) |
| *G06F 3/0484* | (2013.01) |
| *G06N 5/04* | (2006.01) |
| *G06F 3/04847* | (2022.01) |

(52) U.S. Cl.
CPC ....... *G06Q 30/0625* (2013.01); *G06F 3/0482* (2013.01); *G06F 3/04847* (2013.01); *G06F 9/451* (2018.02); *G06F 16/9535* (2019.01); *G06F 16/9538* (2019.01); *G06N 5/047* (2013.01); *G06N 20/00* (2019.01); *G06Q 30/0641* (2013.01)

(58) Field of Classification Search
CPC .... G06F 3/0482; G06F 3/04847; G06F 9/451; G06F 16/9535; G06F 16/9538; G06Q 30/0625; G06Q 30/0641; G06N 5/047; G06N 20/00
See application file for complete search history.

(56) References Cited

U.S. PATENT DOCUMENTS

| | | | | |
|---|---|---|---|---|
| 7,647,312 B2* | 1/2010 | Dai | ..................... | G06F 16/3322 |
| | | | | 707/999.004 |
| 8,510,349 B1* | 8/2013 | Puttick | ..................... | G06F 16/22 |
| | | | | 707/805 |
| 8,805,750 B2* | 8/2014 | Bailey | ................... | G06Q 30/02 |
| | | | | 706/12 |
| 10,073,883 B1* | 9/2018 | Wong | ................... | G06F 16/951 |

(Continued)

*Primary Examiner* — Eric J. Bycer
(74) *Attorney, Agent, or Firm* — Morris, Manning & Martin, LLP; Daniel E. Sineway, Esq.; Daniel T. Begasse (57) ABSTRACT

A system and method are disclosed for improving searching functionalities using graphical user interfaces. A web-based platform receives data relating to user activity during a search session, and furthermore presents suggested actions and/or search refinements based on the user activity. Processing modules include logic for identifying patterns and/or indicators in the user activity, and furthermore match detected patterns and/or indicators with suggested actions. The suggested actions are presented on the graphical user interface for allowing a user to refine the search session without exiting or terminating the search session.

20 Claims, 6 Drawing Sheets

(56) References Cited

U.S. PATENT DOCUMENTS

| | | | | |
|---|---|---|---|---|
| 10,706,450 | B1* | 7/2020 | Tavernier | G06Q 30/0625 |
| 10,754,884 | B1* | 8/2020 | Daimler | G06F 16/335 |
| 2006/0026147 | A1* | 2/2006 | Cone | G06F 16/9535 |
| 2006/0155673 | A1* | 7/2006 | Houck | G06F 16/3329 |
| 2006/0195442 | A1* | 8/2006 | Cone | G06Q 30/00 |
| 2008/0177717 | A1* | 7/2008 | Kumar | G06F 16/3322 |
| 2009/0030800 | A1* | 1/2009 | Grois | G06Q 30/0277 |
| | | | | 705/14.52 |
| 2009/0292677 | A1* | 11/2009 | Kim | G06F 16/958 |
| 2010/0153324 | A1* | 6/2010 | Downs | G06F 40/258 |
| | | | | 706/21 |
| 2011/0191364 | A1* | 8/2011 | LeBeau | G06F 16/3338 |
| | | | | 707/767 |
| 2016/0335693 | A1* | 11/2016 | Lin | G06F 16/90324 |
| 2017/0091343 | A1* | 3/2017 | Shorina | G06F 16/242 |
| 2017/0371954 | A1* | 12/2017 | Kikuchi | G06F 16/3322 |
| 2019/0130006 | A1* | 5/2019 | Raviv | G06F 16/9032 |

* cited by examiner

SYSTEMS AND METHODS FOR DISPLAYING FILTERS AND INTERCEPTS LEVERAGING A PREDICTIVE ANALYTICS ARCHITECTURE

CROSS REFERENCE TO RELATED APPLICATIONS

This application claims the benefit of, and priority to, U.S. Provisional Patent Application No. 62/714,288, filed on Aug. 3, 2018, and entitled, "SYSTEMS AND METHODS FOR DISPLAYING FILTERS AND INTERCEPTS LEVERAGING A PREDICTIVE ANALYTICS ARCHITECTURE," the disclosure of which is incorporated by reference as if the same were set forth fully herein.

BACKGROUND

Conventional systems and methods for searching listings on web-based platforms typically display an initial collection of listings, and a user may scroll or swipe through the listings in order to search for a listing he/she finds interesting. These conventional systems generally allow for the user to select one or more options for filtering the listings, thereby narrowing the collection of listings to meet the filtered criteria. The process of searching and filtering listings in conventional systems is often a manual process that requires the user to know for what exactly he or she is intending to search at the beginning of the search process, and often the user never explores other listings that may be of interest to him/her. Furthermore, these antiquated processes lack the ability to intelligently recognize current user search activity, as well as prior user search history, for aiding searches.

Therefore, there exists a long felt but unresolved need for systems and methods for leveraging a predictive analytics architecture to intelligently present filters and intercepts to users searching a web-based platform and for allowing the user to select additional filter criteria during the search that may have previously been unexplored.

BRIEF SUMMARY OF DISCLOSURE

The present systems and methods relate generally to leveraging a predictive analytics architecture for determining optimized filters and intercepts to display in a web-based platform. Consider, for example, a scenario where a user is searching for property listings (available apartments) within a web-based platform accessed from a mobile computing device, desktop computer, etc. Upon beginning the search, the user may choose to select one or more filter criteria (e.g., 1-bedroom, 2-bedroom, in-unit washer and dryer, dishwasher, pool, etc.) for displaying a narrowed collection of listings, based on the selected criteria. In various embodiments, the system includes a filter and intercept analytics engine ("analytics engine") for monitoring the user's activity within the web-based platform for determining particular filters and intercepts to present (or otherwise display) to the user during his/her search. In one embodiment, the analytics engine may detect user activity within the web-based platform such as filters selected, listings viewed, time spent viewing each listing, consistently viewed image-types per listing (e.g., kitchens, bedrooms, bathrooms, etc.), and others. In particular embodiments, the analytics engine may begin detecting and storing this data in response to the user accessing the web-based platform, and furthermore the system may include cookie-like stored data files representative of the user's prior web-based platform activity for comparing present activity to past activity. According to various aspects of the present disclosure, the analytics engine may determine to present options (e.g. inline-filters or intercepts) to the searching user, such as a slide-out or pop-up options for selecting additional filter criteria that the user may not have selected in the present search. For example, the user may be searching all available listings without filtering the search according to number of bedrooms per apartment. The analytics engine may recognize the parameters (or lack thereof) of the current search, retrieve historical search data associated with the particular user indicating that the particular user typically views 1-bedroom listings or selects 1-bedroom filters, and furthermore inject an intercept into the current search, thereby prompting the web-based platform to display a notification, pop-up, slide-out, modify a current display while preserving the "look and feel" of the current display, etc., at the mobile computing device for the user to either engage with (e.g., filter the search based on the number of bedrooms) or deny the intercept and continue with his/her search. In some embodiments, the analytics engine may determine to inject an intercept into the current search based on activity detected from other users' independent searches. For example, the analytics engine may detect patterns or trends for particular search criteria in searches not associated with the user, and the analytics engine may determine to present intercepts corresponding to those trends (e.g., present an intercept for filtering listings based on the most commonly searched price range). In some embodiments, searches from similar users (e.g., age, income, etc.) may be leveraged for determining appropriate intercepts, or any relevant search from any user may be leveraged.

In one embodiment, the architectural structure and components of the analytics engine optimize the system's ability for displaying filters and intercepts to the user, therein improving the overall search functionality. As will be described in greater detail herein, the analytics engine is operable to receive a stream of real-time data from one or more disparate sources, such as the web-based platform. According to various aspects of the present disclosure, this data stream includes various types of data relating to a user's activity within the web-based platform, such as "trigger events" or indicators relating to types of listing viewed (e.g., apartments, houses, etc.), particular selected searching criteria (e.g., one-bedroom, two-bedrooms, walk-in closet, etc.), time spent viewing each listing, etc. In certain embodiments, particular components of the analytics engine may parse and extract the various types of data from the data stream, furthermore transmit the extracted data to particular processing units within the analytics engine (static and/or dynamic processing groups) and, based on computing outcomes at the particular processing units, the analytics engine may create a unique data object to be received by a computing device for displaying filters and intercepts. In various embodiments, the particular processing units may implement machine learning techniques for processing the extracted data, or the particular processing units may have predetermined processing configurations. In these embodiments, the unique data object is created for presenting the user with a filter or intercept based on his/her current activity, and/or based on predictive analytics.

According to various aspects of the present disclosure, the analytics engine includes components and modules supported by Apache® Kafka® as well as Apache® Flink®. In particular embodiments, the Kafka® and Flink®-supported modules may leverage machine learning computing techniques to analyze data, such as browsing activity from the web-based platform, to predict future behavior and present filters and intercepts in anticipation of that behavior, or potentially to automatically change the display of a current web-based platform search session (e.g., presenting an image of a bathroom to a searcher if the searcher has navigated to images of the bathroom during prior searches). In some embodiments, the analytics engine may transform the data to be included as a filter and/or intercept into a unique/particular data object (e.g., a custom format) that will be recognized by the web-based platform and mobile computing device for displaying/servicing the filter and/or intercept appropriately.

In various embodiments, the present disclosure discussed a system including: a web-based platform including one or more processing modules, wherein the web-based platform is operatively connected to an electronic computing device executing an application, and wherein the web-based platform receives search session data from the electronic computing device, the search session data corresponding to a user viewing and interacting with a particular property listing included in a property listing search session presented on a display at the electronic computing device, and wherein the web-based platform is operable to: in response to receiving the search session data, process the search session data at the one or more processing modules to identify search session patterns and/or indicators representative of user search behavior via static logic or dynamic logic, wherein the static logic includes predetermined logic for identifying predetermined search patterns and/or indicators within the search session data, and wherein the dynamic logic includes machine learning-generated logic for identifying search patterns and/or indicators within the search session data not identifiable by the static logic, and wherein the machine learning-generated logic is automatically reconfigured in response to identifying search patterns and/or indicators in the search session data; in response to identifying user search patterns and/or indicators within the search session data, match a particular user action suggestion with the identified user search patterns and/or indicators, wherein the particular user action suggestion includes instructions for modifying the display at the electronic computing device for presenting suggested property listing search refinement parameters; and transmit the particular user action suggestion to the electronic computing device, wherein the particular user action suggestion is transmitted as a visually-presentable data object and includes instructions for establishing a connection back to the web-based platform for returning selected property listing search refinement parameters received in response to the user engaging with the particular user action suggestion, and wherein the particular user action suggestion is presented on the display at the mobile computing device without disrupting the presentation of the property listing search session.

In one embodiment, the indicators included in the search session data include total time spent viewing the particular property listing. In certain embodiments, the one or more processing modules include machine learning algorithms for generating predicted property listing characteristics desired by the user based on the search session data. In a particular embodiment, the web-based platform includes third-party user data corresponding to a geolocation associated with the particular property listing, and further including searched parameters by a plurality of different users associated with the geolocation.

In a particular embodiment, the selected property listing search refinement parameters include data relating to user interaction with an adjustable slide bar or selection of property listing search parameters. In at least one embodiment, the web-based platform is further operable to: receive the selected property listing search refinement parameters in response to the user interacting with the user action suggestion; and transmit one or more refined property listings to the mobile computing device to be presented on the display, wherein the one or more refined property listings include property listing characteristics included in the selected property listing search refinement parameters.

In various embodiments, the search session data includes real-time and/or historical data corresponding to trends in searching property listings on mobile computing devices. In certain embodiments, the historical data includes prior search session data corresponding to the user and/or other users. In one embodiment, the particular user action suggestion is presented in-line with one or more property listings of the property listing search session, wherein the particular user action suggestion is presented in a visual format substantially similar to the one or more property listings. According to various aspects of the present disclosure, the particular user action suggestion is presented as a slide-out or pop-up notification visually resembling the one or more property listings.

In one embodiment, the present disclosure discusses a method executed via a web-based platform including one or more processing modules, wherein the web-based platform is operatively connected to an electronic computing device executing an application, and wherein the web-based platform receives search session data from the electronic computing device, the search session data corresponding to a user viewing and interacting with a particular property listing included in a property listing search session presented on a display at the electronic computing device, the method including the steps of: in response to receiving the search session data, processing the search session data at the one or more processing modules to identify search session patterns and/or indicators representative of user search behavior via static logic or dynamic logic, wherein the static logic includes predetermined logic for identifying predetermined search patterns and/or indicators within the search session data, and wherein the dynamic logic includes machine learning-generated logic for identifying search patterns and/or indicators within the search session data not identifiable by the static logic, and wherein the machine learning-generated logic is automatically reconfigured in response to identifying search patterns and/or indicators in the search session data; in response to identifying user search patterns and/or indicators within the search session data, matching a particular user action suggestion with the identified user search patterns and/or indicators, wherein the particular user action suggestion includes instructions for modifying the display at the electronic computing device for presenting suggested property listing search refinement parameters; and transmitting the particular user action suggestion to the electronic computing device, wherein the particular user action suggestion is transmitted as a visually-presentable data object and includes instructions for establishing a connection back to the web-based platform for returning selected property listing search refinement parameters received in response to the user engaging with the particular user action suggestion, and wherein the particular user action suggestion is presented on the display at the mobile computing device without disrupting the presentation of the property listing search session.

In certain embodiments, the indicators included in the search session data include total time spent viewing the particular property listing. In various embodiments, the one or more processing modules include machine learning algorithms for generating predicted property listing characteristics desired by the user based on the search session data. In a particular embodiment, the web-based platform includes third-party user data corresponding to a geolocation associated with the particular property listing, and further including searched parameters by a plurality of different users associated with the geolocation.

According to various aspects of the present disclosure, the selected property listing search refinement parameters include data relating to user interaction with an adjustable slide bar or selection of property listing search parameters. In certain embodiments, the method further includes the steps of: receiving the selected property listing search refinement parameters in response to the user interacting with the user action suggestion; and transmitting one or more refined property listings to the mobile computing device to be presented on the display, wherein the one or more refined property listings include property listing characteristics included in the selected property listing search refinement parameters.

In various embodiments, the search session data includes real-time and/or historical data corresponding to trends in searching property listings on mobile computing devices. In one embodiment, the historical data includes prior search session data corresponding to the user and/or other users. In a particular embodiment, the particular user action suggestion is presented in-line with one or more property listings of the property listing search session, wherein the particular user action suggestion is presented in a visual format substantially similar to the one or more property listings. In one embodiment, the particular user action suggestion is presented as a slide-out or pop-up notification visually resembling the one or more property listings.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Overview

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Aspects of the present disclosure generally relate to leveraging a predictive analytics architecture for determining optimized filters and intercepts to display in a web-based platform. Consider, for example, a scenario where a user is searching for property listings (available apartments) within a web-based platform accessed from a mobile computing device, desktop computer, etc. Upon beginning the search, the user may choose to select one or more filter criteria (e.g., 1-bedroom, 2-bedroom, in-unit washer and dryer, dishwasher, pool, etc.) for displaying a narrowed collection of listings, based on the selected criteria. In various embodiments, the system includes a filter and intercept analytics engine ("analytics engine") for monitoring the user's activity within the web-based platform for determining particular filters and intercepts to present (or otherwise display) to the user during his/her search. In one embodiment, the analytics engine may detect user activity within the web-based platform such as filters selected, listings viewed, time spent viewing each listing, consistently viewed image-types per listing (e.g., kitchens, bedrooms, bathrooms, etc.), and others. In particular embodiments, the analytics engine may begin detecting and storing this data in response to the user accessing the web-based platform, and furthermore the system may include cookie-like stored data files representative of the user's prior web-based platform activity for comparing present activity to past activity. According to various aspects of the present disclosure, the analytics engine may determine to present options (e.g. inline-filters or intercepts) to the searching user, such as a slide-out or pop-up options for selecting additional filter criteria that the user may not have selected in the present search. For example, the user may be searching all available listings without filtering the search according to number of bedrooms per apartment. The analytics engine may recognize this and inject an intercept into the current search, thereby prompting the web-based platform to display a notification, pop-up, slide-out, etc., to the mobile computing device for the user to either engage with (e.g., filter the search based on the number of bedrooms) or deny the intercept and continue with his/her search.

In one embodiment, the architectural structure and components of the analytics engine optimize the system's ability for displaying filters and intercepts to the user, therein improving the overall search functionality. As will be described in greater detail herein, the analytics engine is operable to receive a stream of real-time data from one or more disparate sources, such as the web-based platform.

According to various aspects of the present disclosure, this data stream includes various types of data relating to a user's activity within the web-based platform, such as indicators relating to types of listing viewed (e.g., apartments, houses, etc.), particular selected searching criteria (e.g., one-bedroom, two-bedrooms, walk-in closet, etc.), time spent viewing each listing, etc. In certain embodiments, particular components of the analytics engine may parse and extract the various types of data from the data stream, furthermore transmit the extracted data to particular processing units within the analytics engine (static and/or dynamic processing groups) and, based on computing outcomes at the particular processing units, the analytics engine may create a unique data object to be received by a computing device for displaying filters and intercepts. In various embodiments, the particular processing units may implement machine learning techniques for processing the extracted data, or the particular processing units may have predetermined processing configurations. In these embodiments, the unique data object is created for presenting the user with a filter or intercept based on his/her current activity, and/or based on predictive analytics.

According to various aspects of the present disclosure, the analytics engine includes components and modules supported by Apache® Kafka® as well as Apache® Flink®. In particular embodiments, the Kafka® and Flink®-supported modules may leverage machine learning computing techniques to analyze data, such as browsing activity from the web-based platform, to predict future behavior and present filters and intercepts in anticipation of that behavior, or potentially to automatically change the display of a current web-based platform search session (e.g., presenting an image of a bathroom to a searcher if the searcher has navigated to images of the bathroom during prior searches). In some embodiments, the analytics engine may transform the data to be included as a filter and/or intercept into a unique/particular data object (e.g., a custom format) that will be recognized by the web-based platform and mobile computing device for displaying/servicing the filter and/or intercept appropriately.

Figure 1:
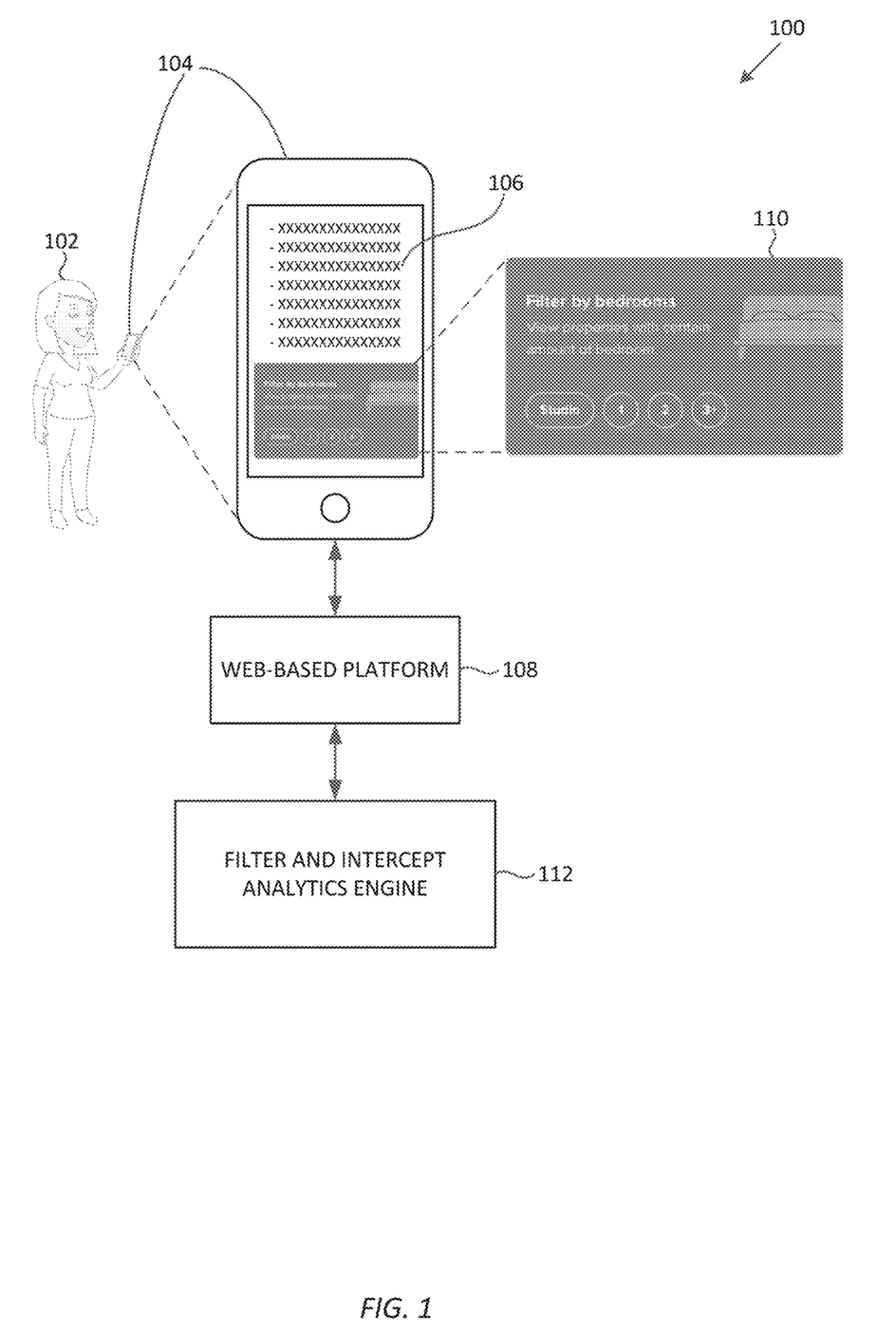
FIG. 1 is a diagram of the filter and intercept system, according to one aspect of the present disclosure.

Referring now to the figures, FIG. 1 illustrates an exemplary diagram of the filter and intercept system ("the system") 100, according to one aspect of the present disclosure. In various embodiments, the system 100 is a distributed system including multiple components, both physical and/or virtual, that exist and operate at various physical locations to allow for the system 100 to provide filters and intercepts to a user. As will be described in greater detail in the discussion immediately below, the system 100 allows for a computing device operated by a user to receive, retrieve, or otherwise access data from a web-based platform 108, or another type of server system. Accordingly, the activity and interaction by the user and his/her computing device with the data at the web-based platform may be received by computing components configured to analyze the user's activity and furthermore transmit data representative of filters, intercepts, or suggestions, to the web-based platform to be presented to the user via his/her computing device.

As show in the present embodiment, a user 102 is holding a smartphone 104 (or another similar mobile computing device). According to various aspects of the present disclosure, the user 102 may be accessing a set of listings 106, or other filterable collections of digital information, via his/her smartphone 104. In one embodiment, the listings 106 may be real-estate or apartment listings displayed as a series of pictures, or the listings 106 may include other types of information that may be listed and/or searched according to various criteria.

In certain embodiments, the listings 106 may be accessed via a web-based platform 108 operatively connected to the smartphone 104 over a communications network, such as the internet, Bluetooth®, LAN, etc. In some embodiments, the web-based platform (and/or supporting servers) includes databases for storing the data included in the listings 106 and software modules (e.g., REST API modules, SQL modules, etc.) for receiving queries from the smartphone 104 and furthermore transmitting the queried data to the smartphone 104 to be displayed to the user 102.

Consider an example where the user 102 is searching for apartments on the web-based platform 108 using his/her smartphone 104 and has not selected his/her preferred apartment size (indicated by number of bedrooms). According to various aspects of the present disclosure, the user's search on his/her smartphone 104 display may be intercepted (e.g., stopped, paused, interrupted, etc.) to receive and display a filter 110. In certain embodiments, the filter 110 is a notification, pop-up, slide-out, or "card," that is displayed to the user 102 during his/her search. Throughout the discussion herein, the use of the terms intercept and filter are used synonymously to describe the interruptive nature of displaying a visual notification or prompt to the user 102 that was not previously displayed. In various embodiments, the filters and intercepts represent the injection of interactive content which the user 102 may interact with, and interaction with the filter/intercept may result in an action relating to the currently viewed content, such as revising search criteria to seamlessly present a different set of apartment listings. In one embodiment, the filter 110 may overlap with the previously displayed listings 106, the listings 106 may be shifted to accommodate the filter 110, or the user may be prompted to accept a filter 110 before it is displayed in-full to the user 102. In some embodiments, the filter is displayed within a "carousel" of multiple notifications, cards, etc., that may be swiped through, clicked through, or otherwise sequentially navigated by the user 102. In particular embodiments, the filter 110 may be seamlessly integrated into listings not yet presented to the user 102, such that these seamlessly integrated filters are "in line" to be presented, and will eventually be presented to the user 102 in response to viewing the preceding listings or images relating to particular listings. Particular examples and embodiments of presenting an "in line" filter (or filter card) are discussed below in the descriptions associated with of FIGS. 6-8.

Continuing with FIG. 1, and in response to being presented with the filter 110, the user may choose to engage with the filter 110 by selecting one of the proposed filter options, such as selecting the "Studio" option as shown in the present embodiment. According to various aspects of the present disclosure, selecting the "Studio" option may in response narrow the user's 102 search to apartments or apartment buildings that offer studio sized living space. In particular embodiments, selecting the studio option may seamlessly update the listings being presented on the user's 102 smartphone 104, or update a queue of listings to be presented, such that the next listing the user 102 views may be a studio apartment. Accordingly, aspects of the present disclosure allow for updating listings or other similar search results without compromising the specific format or "look-and-feel" of the current search.

As will be described in greater detail below in the discussion of FIG. 2, the particular filters 110 presented to the user 102 may be determined based on static and/or dynamic analytics groups within a filter and intercept analytics engine 112 ("analytics engine"). In particular embodiments, the analytics groups receive inbound data streams from the web-based platform 108 in response to the user's 102 activity on the web-based platform 108. In response to receiving inbound data streams, the analytics groups may process the inbound data streams according to the type of data received (e.g., time spent on a particular image, type of image consistently navigated to, erratic searching patterns, etc.), and furthermore determines appropriate filters 110 or intercepts to present based on either predetermined instructions or machine learning computing techniques. In some embodiments, the analytics engine 112 is operatively connected to (or locally includes) a machine learning database which may include large datasets (structured or unstructured) of historical search queries or trained models for analyzing search patterns such as the inbound data stream, and this machine learning database may be queried by components of the analytics engine 112 for accessing this data. According to various aspects of the present disclosure, comparing the inbound data stream against data from the machine learning database may allow for the analytics engine 112 to reach predictive outcomes for presenting filters 110, and also determine the most effective times to present the filters 110.

Figure 2:
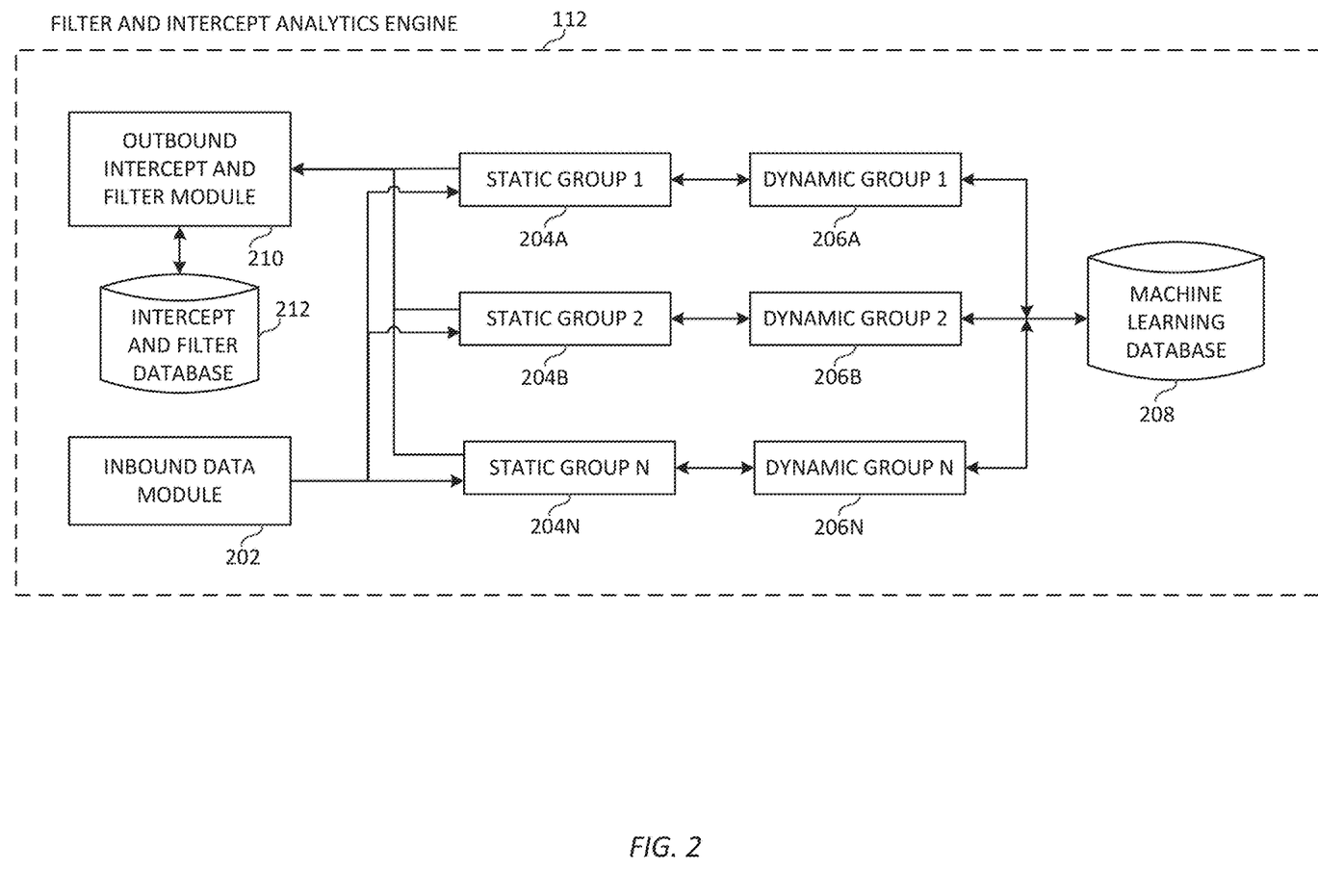
FIG. 2 is a diagram of the analytics engine, according to one aspect of the present disclosure.

Turning now to FIG. 2, an architectural diagram of the analytics engine 112 is shown, according to one aspect of the present disclosure. In one embodiment, inbound data such as a data stream from the web-based server 108 is received at the inbound data module 202. In particular embodiments, the inbound data module 202 is supported by Apache® Kafka®, a stream processing software platform for handling real-time data feeds, which may include data such as JSON, XML, other serialized data formats, etc. In some embodiments, processing tools similar to Apache® Kafka® may be used to a substantially similar extent. In certain embodiments, protocol buffers, such as Protobuf™, may be used for serializing the real-time data feeds.

In various embodiments, in response to receiving the inbound data streams at the inbound data module 202, the inbound data module 202 may parse, scan, or otherwise separate/categorize the received data stream, and furthermore transmit the categorized received data to one or more static groups (e.g., static groups 204A-204N). In particular embodiments, the one or more static groups are processing units operable to execute computer instructions according to predetermined configurations (e.g., a particular static group may be configured to process click events, scroll events, activity from particular portions of a web resource/page, etc.). In various embodiments, the distribution of the one or more static groups allows for parallel processing on the received data stream, thereby resulting in higher throughput and lower latency. As shown in the present embodiment, three static groups are included within the analytics engine 112: static group 1 (204A), static group 2 (204B), and static group N (204N). According to various aspects of the present disclosure, these static groups are each individually configured for handling particular data requests and queries included in the data stream, and these static groups may be predetermined to execute certain actions based on the received data. Particular embodiments of the system 100 include one or more dynamic groups, illustrated in FIG. 2 as dynamic group 1 (206A), dynamic group 2 (206B), and dynamic group N (206N). Accordingly, it should be understood that the system may include more or less static and/or dynamic groups than as shown in the present embodiment, and the static group N (204N) as well as dynamic group N (206N) are intended to represent a limitless number of static and dynamic groups.

Similar to the static groups, the dynamic groups receive separated/categorized data from the inbound data stream. According to various aspects of the present disclosure, the dynamic groups 206A-206N leverage machine learning techniques to further process the data received by the static groups 204A-204N, or different data, for determining patterns or correlations in the received data (and/or data compared with previously stored data) for determining or predicting new filters 110 to present to the user 102. In various embodiments, the dynamic groups 206A-206N are configured to perform machine learning techniques such as random forest generation and neural networks for determining patterns and correlations in the data stream that may resemble previously identified searching behavior, and therefore, the system 100 may present the user 102 with a tailored filter 110. In some embodiments, other techniques such as cluster analysis may be used to identify highly correlated data points (e.g., relationships between user demographics and preferred geographical region). In certain embodiments, the system may implement boosted trees, or gradient boosting, for producing prediction models (e.g., decision trees) via processing regression and statistical classification algorithms.

According to various aspects of the present disclosure, the static groups 204A-204N and dynamic groups 206A-206N are similar in that both sets of computing units process data from the inbound data stream, however, the static groups and dynamic groups may operate according to different sets of rules or configurations. For example, the static groups 204A-204N may be preconfigured (by a system administrator or the like) for monitoring certain types of data included in the inbound data stream and executing predetermined actions based on the monitored data. The dynamic groups 206A-206N may monitor the same inbound data stream, and even the same types of data within the data stream currently being monitored by the static groups 204A-204N, but the dynamic groups 206A-206N are not bound to predetermined parameters for decision making (e.g., the structure of the dynamic groups 206A-206N morph over time based on learned patterns). In this way, the system may analyze the inbound data stream according to predetermined computing methods via the static groups 204A-204N while also leveraging the predictive nature of the dynamic groups 206A-206N. In some embodiments, the computing outcomes from both the static and dynamic groups may be similar (e.g., determine to present a particular filter/intercept); however, the processing steps to reach the computing outcomes may be different.

In one embodiment, the analytics engine 112 includes a machine learning database 208 which is operatively connected to the dynamic groups 206A-206N. In particular embodiments, the machine learning database 208 includes data corresponding to previously identified searching behavior, data used to train new models and random forests, or other data sets (structured and unstructured) for executing machine learning techniques and algorithms.

Continuing with FIG. 2, and in various embodiments, the static and/or dynamic groups may determine that the processed data is representative of behavior that indicates an opportunity to improve the user's 102 experience by servicing/presenting an intercept or filter 110 to the user 102. For example, the static group 1 (204A) may be configured to analyze timers included within the data stream, where the timers represent how long the user 102 spends viewing a certain listing. If the user 102 spends more than a certain amount of time (e.g., 60 seconds) on a particular listing, this may represent significant interest in the listing, and the static group 1 (204A) may be configured to recognize this "trigger event" and in response, the system may present a filter 110 to the user 102 that prompts the user to contact the listing poster/manager to further inquire about the listing. According to various aspects of the present disclosure, trigger events may include various actions or behaviors that are tagged within the UI functionality and detected or "triggered" by the web-based platform 108 or mobile computing device 104 in response to the user's 102 activity, such as selecting particular buttons/options, scrolling through lists, searching particular keywords, indicating certain listings as "favorites", hand/finger gestures such as zooming-in, etc., and the trigger event may be included in the data stream transmitted to the analytics engine 112.

In certain embodiments, and continuing with the example immediately above, the dynamic group 1 (206A) may also be configured to analyze timers included within the data stream, however, the computing outcomes of the dynamic group 1 (206A) may not be based on predetermined configurations. Instead, in one embodiment, the dynamic group 1 (206A) may build a random forest (or implement a preexisting model) based on data stored in the machine learning database 208, and furthermore strengthen the random forest based on the incoming data stream from the web-based platform, where the data stream is representative of the user's 102 activity and aspects of the data stream are added to the random forest for improving predictable outcomes. The dynamic group 1 (206A) may learn that the user 102 typically spends approximately 15 seconds viewing apartment listings, and the user 102 usually navigates to the picture of the bathroom. According to particular embodiments, and based on the data learned by the dynamic group 1 (206A), if the user 102 has spent more than 15 seconds on a particular apartment listing and has not yet viewed the bathroom, the dynamic group 1 (206A) may determine or predict that the user 102 is "lost" and furthermore present the user 102 with a filter 110 offering the user 102 to tailor the search to view images of bathrooms. In some embodiments, the system may automatically adjust the search results to view images of bathrooms, instead of offering a filter 110.

In one embodiment, in response to the static groups 204A-204N or dynamic groups 206A-206N determining that a particular intercept or filter 110 is to be displayed to the user 102, the system transmits decision data to an outbound intercept and filter module 210 for compiling the decision data into the appropriate intercept or filter 110. In various embodiments, the outbound intercept and filter module 210 is operatively connected to an intercept and filter database 212 for storing data used for generating the intercepts or filters 110. In particular embodiments, the intercept and filter database 212 may include frameworks, templates, graphics or similar media, text and/or phone numbers relating to particular listings, references to third-party databases, etc., that allow for the decision data to be integrated with the frameworks for generating a custom data object to be transmitted to the user's 102 mobile device 104. In various embodiments, the custom data object may be the filter 110 to be presented on the mobile device 104, or the custom data object may be a packaged data object including the templates, media, phone numbers, instructions for generating the filter 110, etc. In general, the custom data object may be a schema for including the data and media of the filters 110. Accordingly, the filter 110 may be generated at the outbound intercept and filter module 210 and further transmitted to the mobile device 104, or the content for generating the filter 110 may be packaged at the outbound intercept and filter module 210 but generated at the mobile device 114.

Consider an example where one of the static groups 204A-204N determines to present a user 102 with a filter 110 for narrowing the user's 102 current search for apartment listings based on the number of bedrooms in the apartment. In this example, one of the static groups 204A-204N may transmit to the outbound intercept and filter module 210 decision data including data such as the received data from the data stream, processed metrics or thresholds indicating that the user should be presented with a filter, the type of filter to present, when and where to present the filter 110, etc. According to various aspects of the present disclosure, the outbound intercept and filter module 210 is an Apache® Kafka® supported data stream processor for managing, compiling, and transmitting the outbound data from the analytics engine 112. In response to receiving the decision data, in this example, the outbound intercept and filter module 210 may query the intercept and filter database 212 for retrieving data corresponding to the received decision data. The outbound intercept and filter module 210 may query the intercept and filter database 212 for a template associated with filters associated with bedroom numbers. The decision data may be integrated with a filter template to present the user 102 with a filter similar to the filter described immediately below in FIG. 3.

Figure 3:
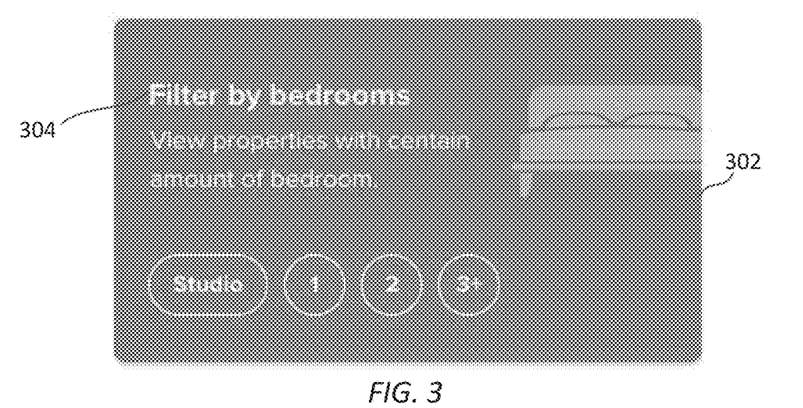
FIG. 3 is an exemplary filter card for filtering by bedrooms, according to one aspect of the present disclosure.

Referring now to FIG. 3, an exemplary filter for filtering apartment listings by bedrooms is shown, according to one aspect of the present disclosure. In the present embodiment, the filter 302 includes a filter prompt 304, "Filter by bedrooms." In one embodiment, this filter prompt 304 allows for the user 102 to understand the purpose for being served the filter 302. Particular embodiments of the system allow for the user 102 to interact with the filter 302 by selecting or touching his/her choice (e.g., Studio) relating to the filter prompt 304 which furthermore results in the transmitting of data regarding the user's 102 selection to the analytics engine 112 for applying action from the selection. As shown in the present embodiment, the filter 302 may display all available bedroom sizes available in the current listing. However, in some embodiments, a dynamic group 206A-206N (described above in the discussion of FIG. 2) may learn that the user 102 typically selects studio and one bedroom apartments. In these embodiments, the filter may include a filter prompt 304 that reads "Would you like to filter by Studio or 1 Bedroom?" According to various aspects of the present disclosure, the filters displayed by the system 100, such as the filter 302 shown in the present embodiment, aim to allow for a searcher to dynamically change his/her search filters and criteria without starting a new search or leaving his/her position in the current search, increasing the efficiency of searching via machine learning, etc.

Figure 4:
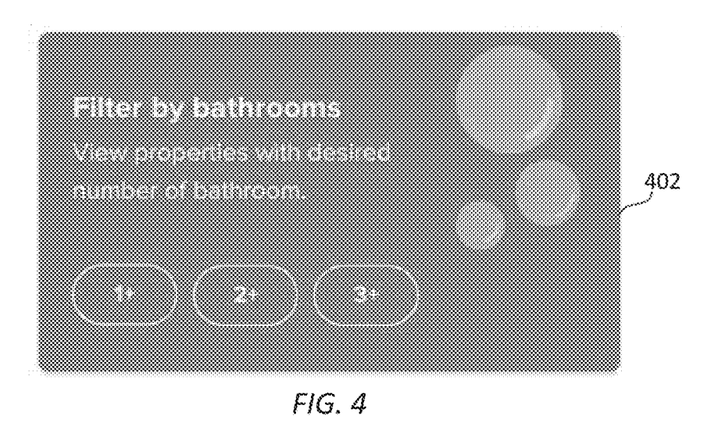
FIG. 4 is an exemplary filter card for filtering by bathrooms, according to one aspect of the present disclosure.
Figure 5:
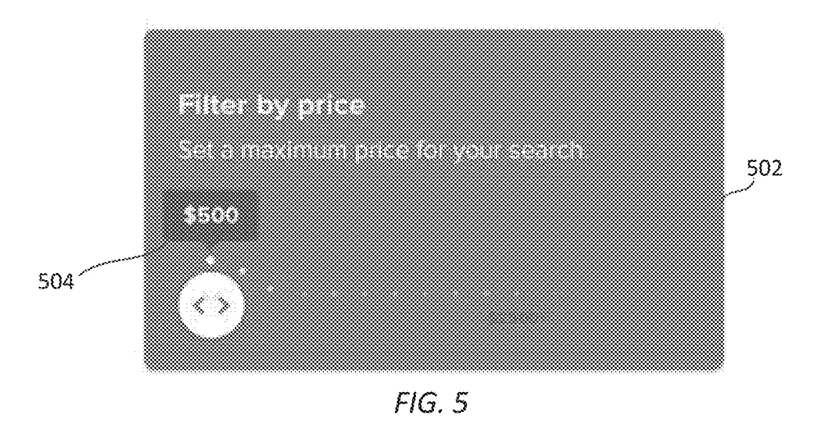
FIG. 5 is an exemplary filter card for filtering by price, according to one aspect of the present disclosure.

FIGS. 4-5 illustrate additional exemplary filters. As shown in the figures, FIG. 4 illustrates a filter 402 for filtering a search based on the number of bathrooms, while FIG. 5 illustrates a filter 502 for filtering a search based on the price of the unit. In these embodiments, the filters may be presented to the user 102 in response to various trigger events, such as the user simply neglecting to search by the number of bathrooms. A static group 204A-204N may determine to present the filter 402 for filtering according to the number of bathrooms to if the user has not explored that filtering criteria. In particular embodiments, the pricing range slider 504 included in the filter 502 may begin at a particular price that the user 102 consistently enters as his/her minimum price range (based on learned behavior from the one or more dynamic groups 206A-206N, cookies stored at the user's 102 mobile device 104, etc.).

Figure 6:
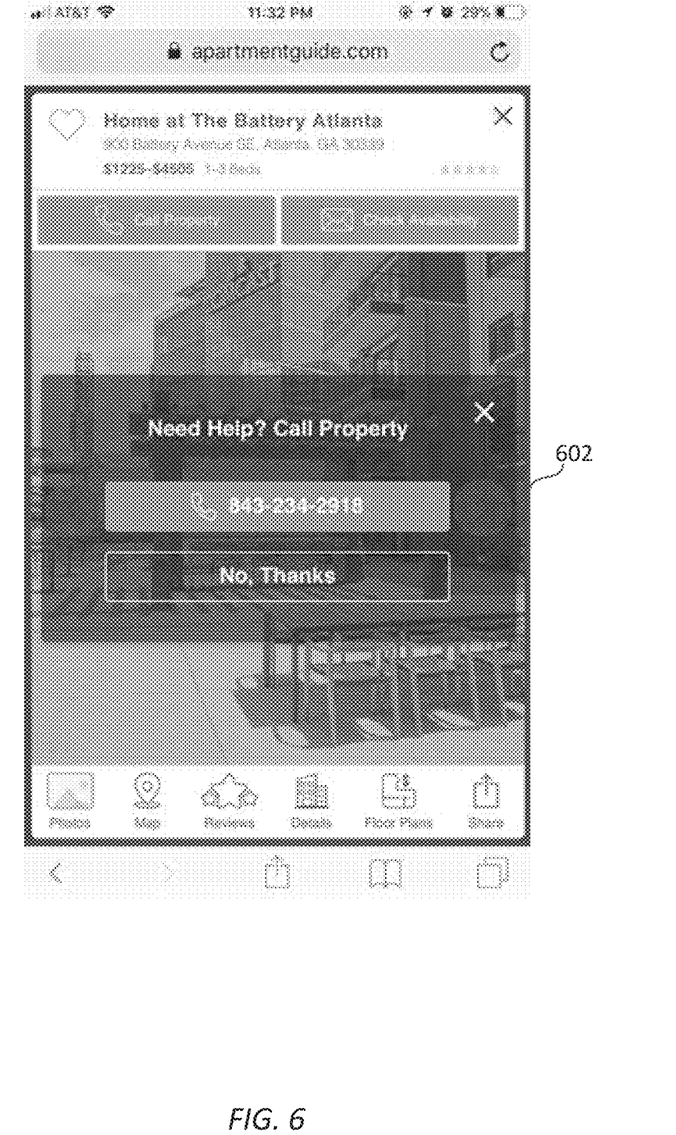
FIG. 6 is an exemplary filter presented during a search, according to one aspect of the present disclosure.

Turning now to FIG. 6, in one embodiment, a filter 602 is shown transparently overlaid onto a property listing. In one embodiment, the filter 602 includes a prompt for the user to contact the property manager associated with the property listing. According to various aspects of the present disclosure, the filter 602 may be displayed to the user 102 in response to the user 102 demonstrating erratic or uncommon search behavior (based on the data stream received at the analytics engine) that may indicate the user being "lost" within the listing, the user 102 may have been viewing the listing for a predetermined amount of time (e.g., two minutes) which is representative of a trigger event processed by a particular static group 204A-204N, which may in turn result is displaying the filter 602, etc. It should be understood based on the present disclosure that the filters, such as the filter 602, may be displayed to users in response to not only predetermined activities, behavior, or patterns in listing browsing, but also the system 100 may leverage machine learning techniques to dynamically determine what type of filters to present, as well as when and where to present them. Moreover, the system 100 may include default filters to be presented at predetermined times, regardless of user behavior.

Figure 7:
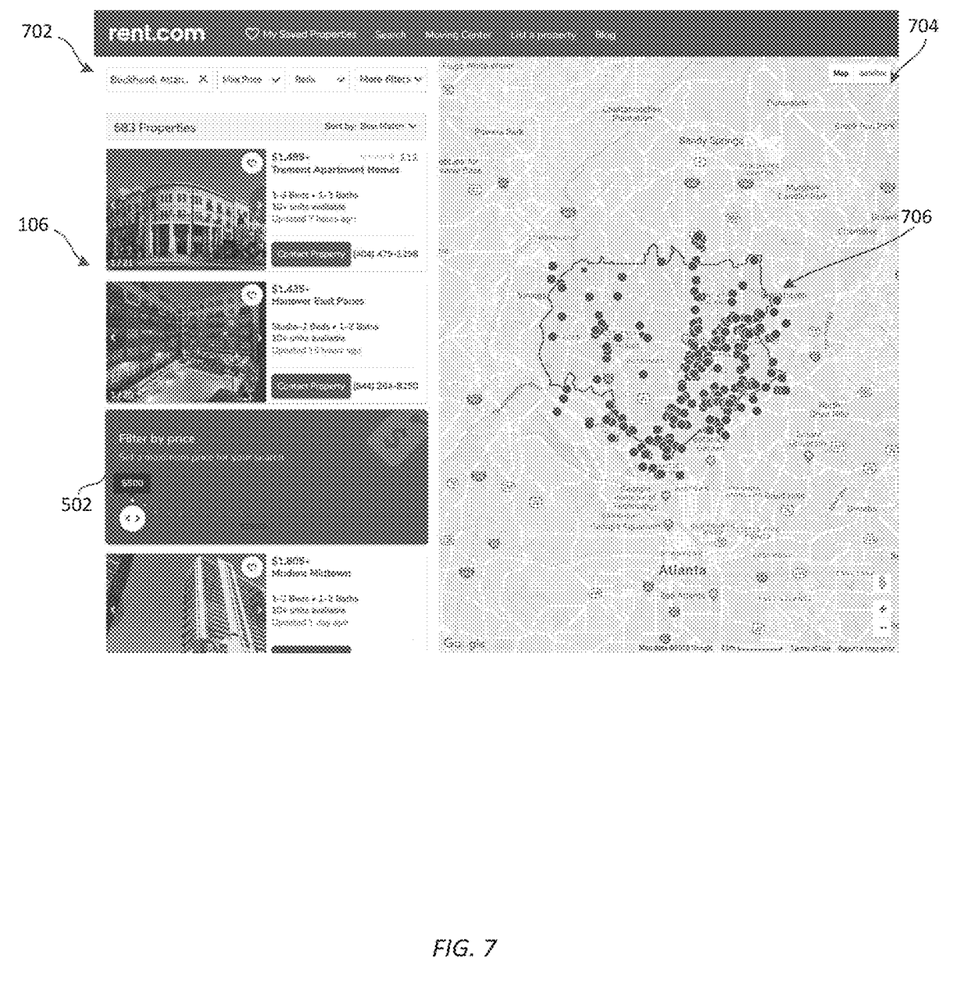
FIG. 7 illustrates an exemplary filter card presented between listings during a search, according to one aspect of the present disclosure.

In one embodiment, FIG. 7 illustrates an exemplary filter card presented between listings during a search. In the present embodiment, listings 106 are displayed within a platform window (as would be shown on a desktop computer or tablet) including a toolbar 702 for entering search criteria, a map region 704 with match indicators 706 corresponding to listings 106 with matching search criteria, and also a scrollable/navigate-able region for viewing the listings 106. Furthermore, the present embodiment includes the filter card 502 with adjustable price range functionality. According to various aspects of the present disclosure, the user 102 may enter "Buckhead, Atlanta" into the search bar 702 and be presented with the available listings in that designated geographical region. In certain embodiments, the system may modify the display to show the filter card 502 in-line with the listings 106 in response to the user 102 scrolling through the listings for a particular amount of time, in response to the system executing learned behavior regarding the user 102, substantially automatically, etc.

Figure 8:
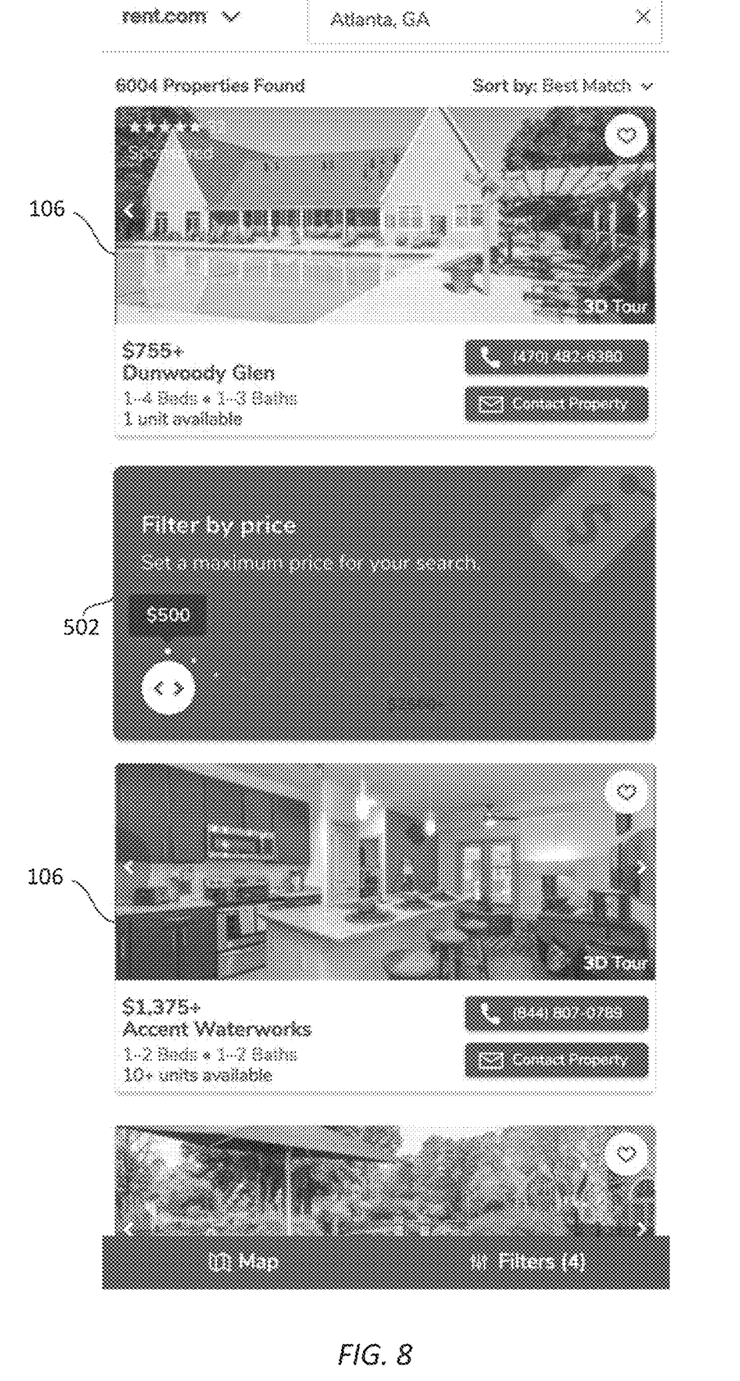
FIG. 8 illustrates an exemplary filter card presented between listings during a search, according to one aspect of the present disclosure.

Turning now to FIG. 8, an exemplary filter card presented between listings during a search is shown. In the present embodiment, listings 106 are shown similar to the listings in FIG. 7 and including the filter card 502. It should be understood that the user 102 may search for listings 106 via a mobile computing device such as a smartphone or tablet, or the user 102 may search for listings 106 via a desktop computer or more stationary device. Accordingly, the listings 106 may be presented to the user in various ways, such as with or without a corresponding map region, smaller or larger search bars, etc., based on available display space and the device configurations.

From the foregoing, it will be understood that various aspects of the processes described herein are software processes (e.g., those supported by Apache® Kafka® and Apache® Flink®) that execute on computer systems that form parts of the system 100. Accordingly, it will be understood that various embodiments of the system 100 described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can include various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions include, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically includes one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

CONCLUSION

Aspects, features, and benefits of the claimed invention(s) will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A system comprising:
   a web-based platform comprising one or more processing modules, wherein the web-based platform is operatively connected to an electronic computing device executing an application, and wherein the web-based platform receives search session data in an uninterrupted data flow from the electronic computing device, the search session data corresponding to a user continuously viewing and interacting with one or more property listings included in a property listing search session presented on a display at the electronic computing device, wherein the property listing search session comprises a presentment of a plurality of property listings displayed as visually-presentable data objects in a linear scrollable arrangement, and wherein the web-based platform is operable to:
      in response to receiving the search session data, process the search session data at the one or more processing modules to identify search session patterns or indicators representative of user search behavior via static logic or dynamic logic, wherein the static logic comprises predetermined logic for identifying predetermined search patterns or indicators within the search session data, and wherein the dynamic logic comprises machine learning-generated logic for identifying search patterns or indicators within the search session data not identifiable by the static logic, and wherein the machine learning-generated logic is automatically reconfigured in response to identifying search patterns or indicators in the search session data;

in response to identifying user search patterns or indicators within the search session data, match a particular user action suggestion with the identified user search patterns and/or indicators, wherein the particular user action suggestion comprises instructions for modifying the display at the electronic computing device for presenting suggested property listing search refinement parameters; and transmit the particular user action suggestion to the electronic computing device, wherein the particular user action suggestion is transmitted as a particular visually-presentable data object and comprises instructions for establishing a connection back to the web-based platform for returning selected property listing search refinement parameters received in response to the user engaging with the particular user action suggestion, wherein the particular user action suggestion is presented on the display at the electronic computing device as the particular visually-presentable data object positioned between two other visually-presentable data objects in the linear scrollable arrangement representing two property listings of the plurality of property listings in response to the user scrolling through the linear scrollable arrangement.

2. The system of claim 1, wherein the indicators included in the search session data comprise total time spent viewing the particular property listing.

3. The system of claim 1, wherein the one or more processing modules comprise machine learning algorithms for generating predicted property listing characteristics desired by the user based on the search session data.

4. The system of claim 1, wherein the web-based platform comprises third-party user data corresponding to a geolocation associated with the one or more property listings, and further comprising searched parameters by a plurality of different users associated with the geolocation.

5. The system of claim 1, wherein the selected property listing search refinement parameters comprise data relating to user interaction with an adjustable slide bar or selection of property listing search parameters.

6. The system of claim 5, wherein the web-based platform is further operable to:

receive the selected property listing search refinement parameters in response to the user interacting with the user action suggestion; and transmit one or more refined property listings to the electronic computing device to be presented on the display, wherein the one or more refined property listings comprise property listing characteristics included in the selected property listing search refinement parameters.

7. The system of claim 1, wherein the search session data comprises real-time and/or historical data corresponding to trends in searching property listings on electronic computing devices.

8. The system of claim 7, wherein the historical data comprises prior search session data corresponding to the user or other users.

9. The system of claim 1, wherein the particular user action suggestion is presented in-line with one or more property listings of the property listing search session, wherein the particular user action suggestion is presented in a visual format comprising dimensions matching those of the one or more property listings.

10. The system of claim 9, wherein the particular user action suggestion is presented as a slide-out notification visually resembling the one or more property listings.

11. A method executed via a web-based platform comprising one or more processing modules, wherein the web-based platform is operatively connected to an electronic computing device executing an application, and wherein the web-based platform receives search session data in an uninterrupted data flow from the electronic computing device, the search session data corresponding to a user continuously viewing and interacting with one or more property listings included in a property listing search session presented on a display at the electronic computing device, wherein the property listing search session comprises a presentment of a plurality of property listings displayed as visually-presentable data objects in a linear scrollable arrangement, the method comprising the steps of:

in response to receiving the search session data, processing the search session data at the one or more processing modules to identify search session patterns or indicators representative of user search behavior via static logic or dynamic logic, wherein the static logic comprises predetermined logic for identifying predetermined search patterns or indicators within the search session data, and wherein the dynamic logic comprises machine learning-generated logic for identifying search patterns or indicators within the search session data not identifiable by the static logic, and wherein the machine learning-generated logic is automatically reconfigured in response to identifying search patterns or indicators in the search session data;

in response to identifying user search patterns or indicators within the search session data, matching a particular user action suggestion with the identified user search patterns and/or indicators, wherein the particular user action suggestion comprises instructions for modifying the display at the electronic computing device for presenting suggested property listing search refinement parameters; and transmitting the particular user action suggestion to the electronic computing device, wherein the particular user action suggestion is transmitted as a particular visually-presentable data object and comprises instructions for establishing a connection back to the web-based platform for returning selected property listing search refinement parameters received in response to the user engaging with the particular user action suggestion, wherein the particular user action suggestion is presented on the display at the electronic computing device as the particular visually-presentable data object positioned between two other visually-presentable data objects in the linear scrollable arrangement representing two property listings of the plurality of property listings in response to the user scrolling through the linear scrollable arrangement.

12. The method of claim 11, wherein the indicators included in the search session data comprise total time spent viewing the particular property listing.

13. The method of claim 11, wherein the one or more processing modules comprise machine learning algorithms for generating predicted property listing characteristics desired by the user based on the search session data.

14. The method of claim 11, wherein the web-based platform comprises third-party user data corresponding to a geolocation associated with the one or more property listings, and further comprising searched parameters by a plurality of different users associated with the geolocation.

15. The method of claim 11, wherein the selected property listing search refinement parameters comprise data relating to user interaction with an adjustable slide bar or selection of property listing search parameters.

16. The method of claim 15, further comprising the steps of:
receiving the selected property listing search refinement parameters in response to the user interacting with the user action suggestion; and
transmitting one or more refined property listings to the electronic computing device to be presented on the display, wherein the one or more refined property listings comprise property listing characteristics included in the selected property listing search refinement parameters.

17. The method of claim 11, wherein the search session data comprises real-time and/or historical data corresponding to trends in searching property listings on electronic computing devices.

18. The method of claim 17, wherein the historical data comprises prior search session data corresponding to the user or other users.

19. The method of claim 11, wherein the particular user action suggestion is presented in-line with one or more property listings of the property listing search session, wherein the particular user action suggestion is presented in a visual format comprising dimensions matching those of the one or more property listings.

20. The method of claim 19, wherein the particular user action suggestion is presented as a slide-out notification visually resembling the one or more property listings.

* * * * *